United States Patent
Ishibashi

(10) Patent No.: US 12,017,582 B2
(45) Date of Patent: Jun. 25, 2024

(54) VEHICULAR ILLUMINATION DEVICE

(71) Applicant: YAZAKI CORPORATION, Tokyo (JP)

(72) Inventor: Shuichi Ishibashi, Makinohara (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 38 days.

(21) Appl. No.: 17/897,629

(22) Filed: Aug. 29, 2022

(65) Prior Publication Data

US 2023/0061287 A1    Mar. 2, 2023

(30) Foreign Application Priority Data

Aug. 30, 2021   (JP) ................... 2021-140306

(51) Int. Cl.
| | | |
|---|---|---|
| *B60Q 3/74* | (2017.01) | |
| *F21Y 103/10* | (2016.01) | |
| *F21Y 115/10* | (2016.01) | |

(52) U.S. Cl.
CPC ............ B60Q 3/74 (2017.02); *F21Y 2103/10* (2016.08); *F21Y 2115/10* (2016.08)

(58) Field of Classification Search
CPC .............................. F21Y 2103/10; B60Q 3/74
See application file for complete search history.

(56) References Cited

U.S. PATENT DOCUMENTS

| | | |
|---|---|---|
| 2003/0133307 A1 | 7/2003 | Sugihara et al. |
| 2005/0219855 A1 | 10/2005 | Iwai |
| 2008/0112175 A1 | 5/2008 | Bucher |
| 2008/0316740 A1* | 12/2008 | Okawa ............... B60Q 3/74 362/231 |
| 2009/0066255 A1 | 3/2009 | Nakayama et al. |
| 2011/0025208 A1 | 2/2011 | Yamashita et al. |
| 2014/0265934 A1 | 9/2014 | Ramey |
| 2015/0197193 A1 | 7/2015 | Oba et al. |
| 2018/0099611 A1* | 4/2018 | Sugimoto ............. G07B 13/04 |
| 2019/0389372 A1* | 12/2019 | Faivre ................. H05B 45/00 |
| 2020/0172009 A1* | 6/2020 | Seol ..................... B60Q 3/74 |
| 2020/0269751 A1 | 8/2020 | Tatara |
| 2021/0190296 A1* | 6/2021 | Andersson ........... B60Q 3/225 |

(Continued)

FOREIGN PATENT DOCUMENTS

| | | |
|---|---|---|
| EP | 2905174 A1 | 8/2015 |
| JP | 2007-276671 A | 10/2007 |

(Continued)

*Primary Examiner* — Christopher E Dunay
(74) *Attorney, Agent, or Firm* — Sughrue Mion, PLLC

(57) ABSTRACT

There is provided a vehicular illumination device to be disposed on a ceiling portion in a vehicle passenger compartment includes: a left-row light source unit in which three or more light sources arranged side by side in a front-rear direction of the vehicle is disposed on a left side of a center in a width direction of the vehicle: and a right-row light source unit in which three or more light sources arranged in the front-rear direction of the vehicle is disposed on a right side of the center in the width direction of the vehicle. Optical paths of the light sources are set to be placed in a state where a light irradiation region of the left-row light source unit and a light irradiation region of the right-row light source unit partially overlap with each other on a floor surface in the vehicle passenger compartment.

13 Claims, 17 Drawing Sheets

(56) References Cited

U.S. PATENT DOCUMENTS

| 2022/0203890 A1* | 6/2022 | Ibáñez | B60Q 3/60 |
| 2022/0258665 A1* | 8/2022 | Lindberg Nilsson | B60Q 3/74 |
| 2022/0289123 A1* | 9/2022 | Howard, Jr. | B60Q 3/51 |

FOREIGN PATENT DOCUMENTS

| JP | 2011-25870 A | 2/2011 |
| JP | 2011-148406 A | 8/2011 |
| JP | 2014-73761 A | 4/2014 |
| JP | 2019-43402 A | 3/2019 |

* cited by examiner

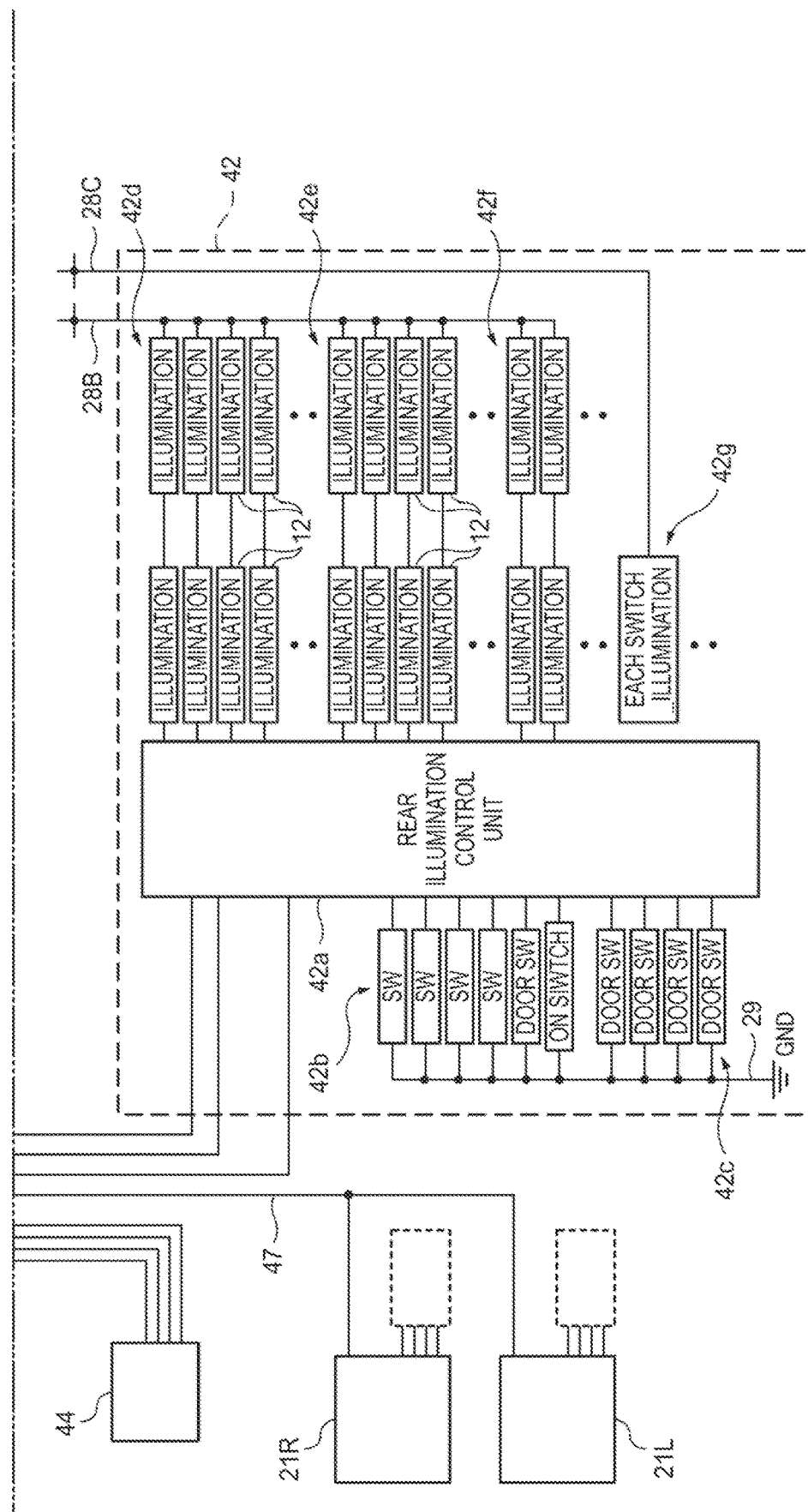

| CIRCUIT CONNECTION PATTERN PC | LIGHT SOURCE LAMP UNIT 1_2LH | | | | LIGHT SOURCE LAMP UNIT 2_2LH | | | | LIGHT SOURCE LAMP UNIT 1_3LH | | | | LIGHT SOURCE LAMP UNIT 2_3LH | | | | NUMBER OF CONTROLLABLE CHANNEL Nch |
|---|---|---|---|---|---|---|---|---|---|---|---|---|---|---|---|---|---|
| | LIGHT SOURCE LAMP 1_2LH ① | | LIGHT SOURCE LAMP 2_2LH ③ | | LIGHT SOURCE LAMP 2_2LH | | LIGHT SOURCE LAMP ④ | | LIGHT SOURCE LAMP 1_3LH ⑤ | | LIGHT SOURCE LAMP 1_3LH ⑥ | | LIGHT SOURCE LAMP 2_3LH ⑦ | | LIGHT SOURCE LAMP 2_3LH ⑧ | | |
| | A | B | C | D | E | F | G | H | I | J | K | L | M | N | O | P | |
| PC1 | O | O | O | O | O | O | O | O | O | O | O | O | O | O | O | O | 16 |
| PC2 | O | O | O | O | O | O | O | O | O | O | O | O | O | O | O | O | 8 |
| PC3 | O | | | O | | | O | | | O | | | O | | | O | 4 |
| PC4 | | | | | O | | | | | | | | | | | | 2 |
| PC5 | O | O | O | O | O | O | O | O | O | O | O | O | O | O | O | | 10 |
| PC6 | O | O | O | O | O | O | O | O | | | O | | O | O | O | | 8 |
| PC7 | O | O | O | O | O | O | O | O | | | O | | O | O | O | | 7 |
| PC8 | O | O | O | O | | | | | O | O | O | | O | O | O | | 6 |
| PC9 | O | O | O | | | | | | | | | | O | | | | 5 |
| PC10 | O | O | O | O | | O | O | | | | O | | O | O | O | | 7 |
| PC11 | O | O | O | O | | O | O | | | | O | | O | O | O | | 6 |
| PC12 | O | O | O | O | | | | | | | O | | O | O | O | | 5 |
| PC13 | O | | | | O | | | O | O | | | | | O | | | 5 |

VEHICULAR ILLUMINATION DEVICE

CROSS-REFERENCE TO RELATED APPLICATIONS

This application is based on and claims priority under 35 USC 119 from Japanese Patent Application No. 2021-140306 filed on Aug. 30, 2021, the contents of which are incorporated herein by reference.

TECHNICAL FIELD

The present disclosure relates to a vehicular illumination device.

BACKGROUND ART

For example, a vehicular illumination device in JP2011-025870A involves a technique of reducing a cost by turning on the light when a door is open and turning on the light when a user approaches a vehicle with one illumination operation. Specifically, when an on-board unit detects the approach of the user, a transistor switch is controlled to be turned on or off at a duty of 60%, and a dome lamp bulb is turned on at an illuminance of 60% for hospitality lighting. In the hospitality lighting, when a door is detected to be open, the transistor switch is constantly turned on (duty: 100%), and the dome lamp bulb is turned on by increasing the illuminance to 100%.

In recent years, there has been an increasing need to form a living space that is easier to use in a vehicle passenger compartment of a vehicle. For example, since an automatic driving technique is being put into practical use, there is an increasing possibility that occupants including a driver perform various activities unrelated to driving in the vehicle passenger compartment even while the vehicle is travelling. Particularly in the case of a vehicle type such as a one-box car or a sport utility vehicle (SUV), the number of passengers and luggage tend to increase, and the types of user activities tend to increase.

On the other hand, in a dark environment such as in the evening or at night, the need for vehicle passenger compartment illumination increases in order to enable various lives of the occupants in the vehicle passenger compartment.

Current vehicles are often mounted with a dome lamp or a room lamp as shown in JP2011-025870A as a device for illuminating the vehicle passenger compartment at night. These are single lamps that illuminate a relatively large range in the vehicle passenger compartment. In addition, a spotlight that can illuminate only a very small range may be disposed above a seat. Further, a lamp or an illumination lamp that illuminates only the foot of the occupant near a door opening when the occupant gels on and off may be mounted.

However, in a dark environment such as at night, the vehicle passenger compartment is relatively dark and difficult to see even when the vehicle passenger compartment illumination is actually turned on, so that it is often inconvenient to live in the living space inside the vehicle. For example, when the occupant moves in the vehicle passenger compartment or tries to pick up a lost item on the floor, shadows are formed due to the influence of shields such as seats, the shadow of the occupant is likely to be formed, and the floor surface tends to be dark. Therefore, it may be difficult for the occupant to move in the vehicle passenger compartment, or it may be difficult to find the lost item.

Since a dedicated illumination device installed near the door opening of the vehicle illuminates only a region necessary for the occupant to get on and off, the dedicated illumination device cannot be used for illuminating a region necessary for living in the vehicle passenger compartment. Further, when such a dedicated illumination device is mounted on a vehicle, a structure of the vehicle is complicated, and a structure of a wire harness that supplies electric power for illumination is complicated.

SUMMARY OF INVENTION

The present disclosure provides a vehicular illumination device that can form a bright environment in which an occupant can easily live in a living space inside a vehicle even in a dark environment.

According to an illustrative aspect of the present disclosure, a vehicular illumination device to be disposed on a ceiling portion in a vehicle passenger compartment includes: a left-row light source unit in which three or more light sources arranged side by side in a front-rear direction of the vehicle is disposed on a left side of a center in a width direction of the vehicle; and a right-row light source unit in which three or more light sources arranged in the front-rear direction of the vehicle is disposed on a right side of the center in the width direction of the vehicle. Optical paths of the light sources are set to be placed in a state where a light irradiation region of the left-row light source unit and a light irradiation region of the right-row light source unit partially overlap with each other on a floor surface in the vehicle passenger compartment.

The present disclosure has been briefly described as above. Details of the present disclosure will be further clarified by reading a mode (hereinafter, referred to as "embodiment") for carrying out the present disclosure described below with reference to the accompanying drawings.

BRIEF DESCRIPTION OF DRAWINGS

FIG. 4A, FIG. 4B, FIG. 4C, and FIG. 4D each show a front view showing the illumination region of each light source when the rear illumination unit shown in FIG. 1 is viewed in a width direction thereof, in which FIG. 4A shows a state when a right door is open, FIG. 4B shows a state when right and left doors are open, FIG. 4C shows a state when the right door is open, and FIG. 4D shows a state when the left door is open.

FIG. 16 is a schematic diagram showing a relationship between a plurality of types of circuit connection patterns and controllable channels.

DESCRIPTION OF EMBODIMENTS

A specific embodiment according to the present disclosure will be described below with reference to the drawings.

Figure 1:
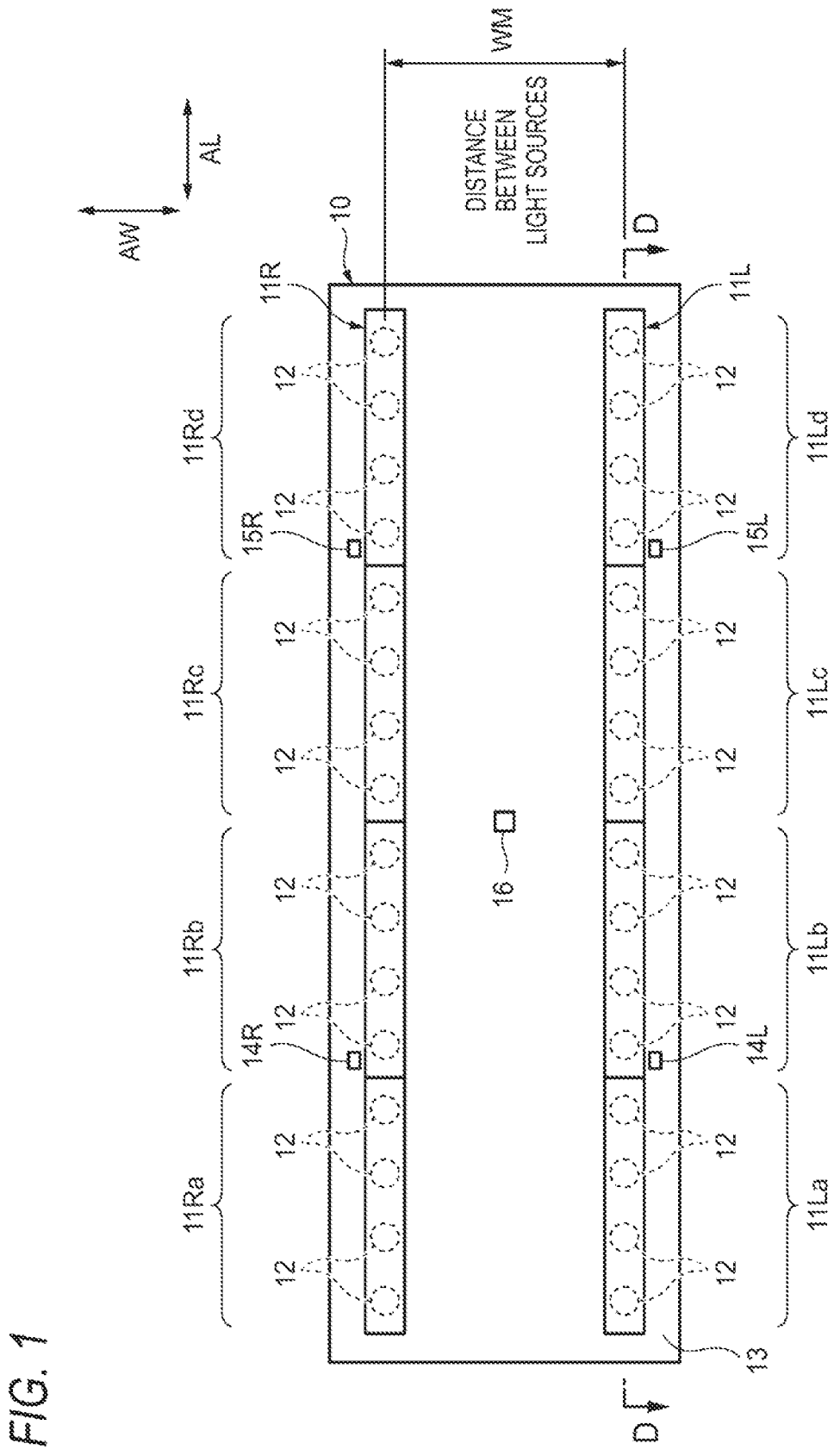
FIG. 1 is a plan view showing a disposition state of a light source and an operation switch in a rear illumination unit.

FIG. 1 shows a disposition state of a light source and an operation switch in a rear illumination unit 10, which is a main component in the present disclosure. The content in FIG. 1 shows an outline of a layout of the rear illumination unit 10 installed on a ceiling in a vehicle passenger compartment in a plane viewed from above through an upper surface of a vehicle body. In addition, a longitudinal direction AL in FIG. 1 corresponds to a front-rear direction of the vehicle body, and a width direction AW corresponds to a left-right direction of the vehicle body.

The rear illumination unit 10 shown in FIG. 1 includes a large number of light emitting elements 12 disposed in two rows in the longitudinal direction AL. In this example, 16 light emitting elements 12 disposed in a row at equal intervals on a left side form a left-row light source lamp module 11L, and 16 light emitting elements 12 disposed in a row at equal intervals on a right side form a right-row light source lamp module 11R. Each light emitting element 12 is a light emitting diode (LED) device. The number of light source lamp modules mounted on the rear illumination unit 10 may be increased to three or more rows.

The light source lamp module 11L has a plurality of module regions 11La, 11Lb, 11Lc, and 11Ld, and the module regions 11La, 11Lb, 11Lc, and 11Ld each have four light emitting elements 12. The light source lamp module 11R has a plurality of module regions 11Ra, 11Rb, 11Rc, and 11Rd, and the module regions 11Ra, 11Rb, 11Rc, and 11Rd each have four light emitting elements 12.

A sufficiently large distance between light sources WM is formed between the two rows of light source lamp modules 11L and 11R. The distance between light sources WM is set to, for example, about ¼ to ½ of a width of the vehicle body.

Each light emitting element 12 of the light source lamp modules 11L and 11R is mounted and supported on a circuit board 13. The circuit board 13 is a printed circuit board, and has a circuit pattern for forming a predetermined electronic circuit by combining the light emitting element 12 and other electronic components.

A full illumination switch 16 is installed at a position substantially in a center of the rear illumination unit 10. Illumination switches 14L, 14R, 15L, and 15R are installed at positions near a front left end, a front right end, a rear left end, and a rear right end of the rear illumination unit 10, respectively.

The illumination switches 14L, 14R, 15L, and 15R, and the full illumination switch 16 each includes an operation unit such as a button that can be operated by an occupant, and are used to manually operate the illumination on/off in the rear illumination unit 10.

Figure 2:
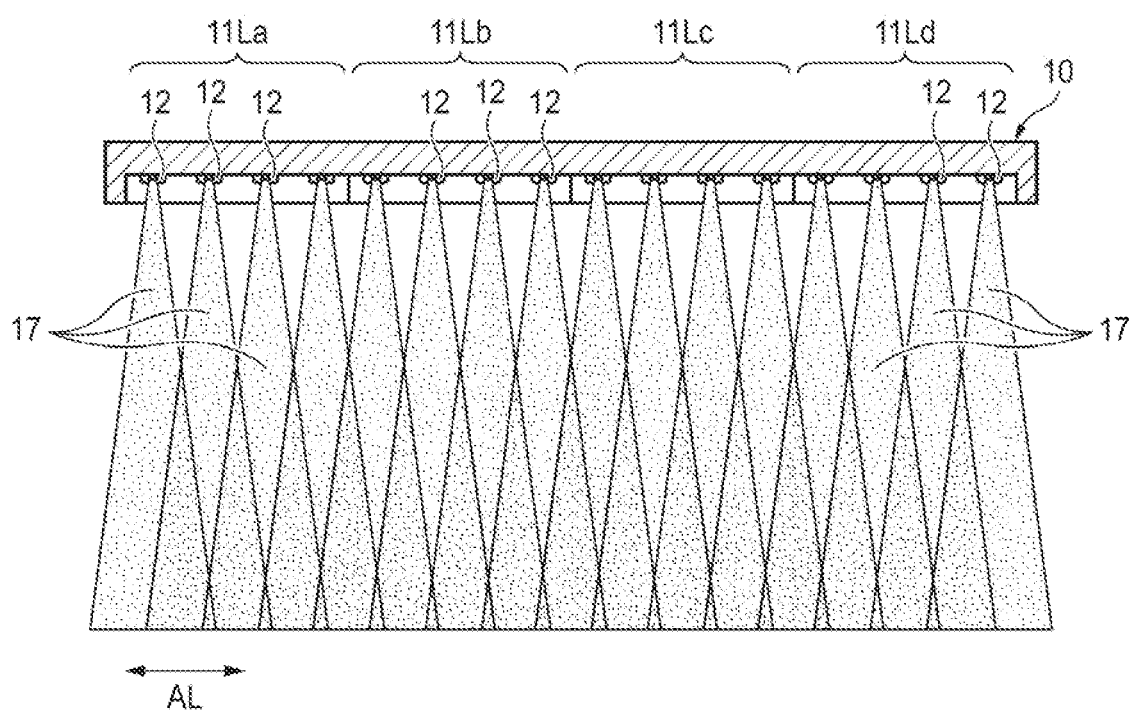
FIG. 2 is a front view showing an illumination region of each light source when the rear illumination unit shown in FIG. 1 is viewed in a longitudinal direction thereof.

FIG. 2 shows a typical example of an illumination region of each light source when the rear illumination unit 10 shown in FIG. 1 is viewed in the longitudinal direction AL. FIG. 2 shows an illumination region 17 in a state where all the light emitting elements 12 are turned on. Further, in the example shown in FIG. 2, a lower end position of the illumination region 17 corresponds to a position of a floor surface in the vehicle passenger compartment.

As shown in FIG. 2, in this example, the illumination region 17 of the light emitting element 12 on the rear illumination unit 10 gradually expands downward from a light emitting position in a state close to a conical shape. In addition, the illumination regions 17 of the plurality of light emitting elements 12 adjacent to each other partially overlap each other at a lower side.

Therefore, in the example in FIG. 2, the illumination regions 17 of the plurality of light emitting elements 12 overlap each other on the floor surface of the vehicle body and at a position close to the floor surface, and bright illumination is implemented. Since the plurality of adjacent illumination regions 17 continuously illuminate regions such as the floor surface, when the occupant moves in the vehicle passenger compartment, shadows of the occupant, the seat, etc. are less likely to be formed, and the movement is easy.

Figure 3:
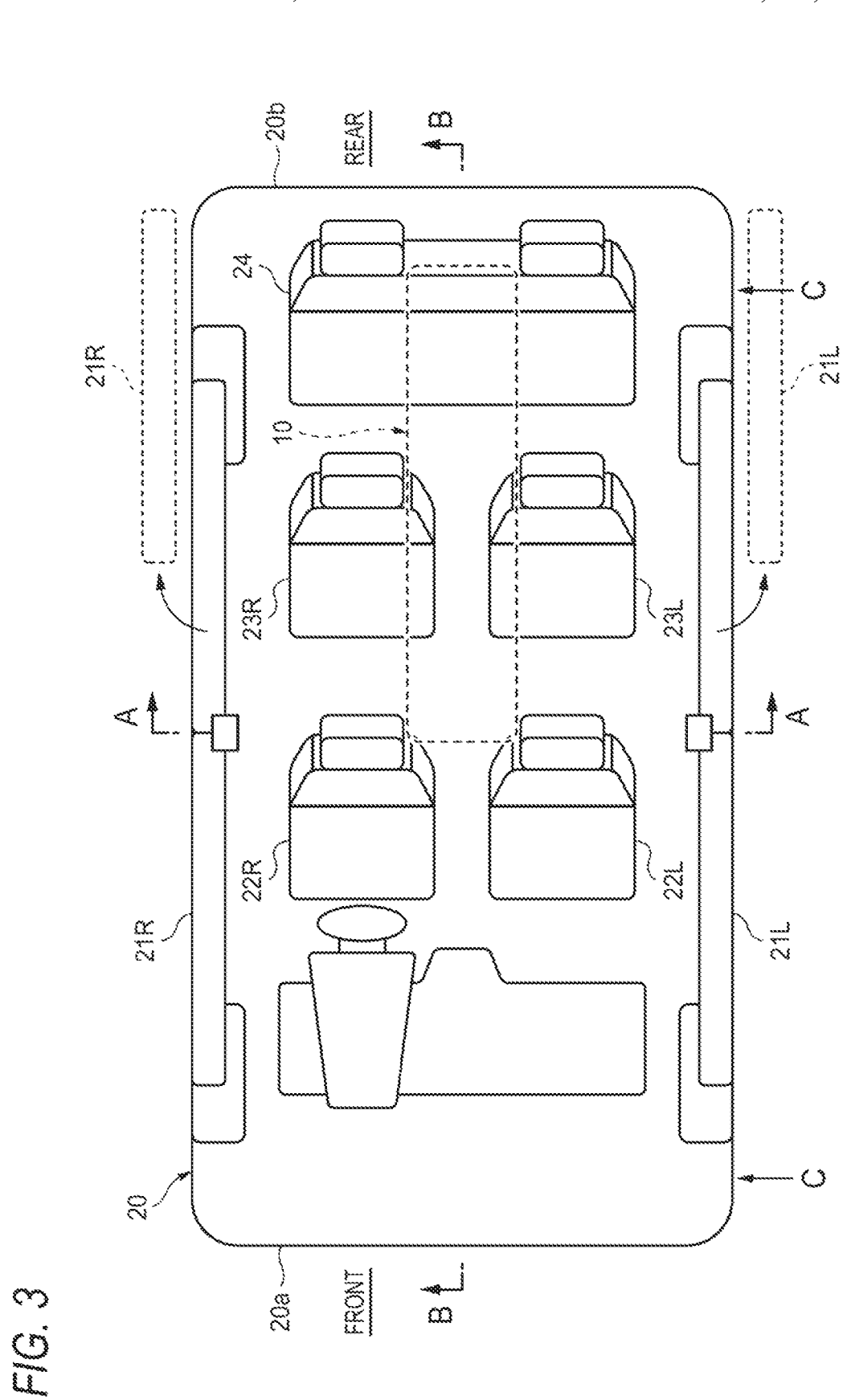
FIG. 3 is a plan view showing a disposition state of main components inside a vehicle body.

FIG. 3 shows a disposition state of main components inside a vehicle body 20. That is, FIG. 3 shows a layout of the vehicle passenger compartment in a plane that can be seen through the ceiling of the vehicle body, and a left side and a right side in FIG. 3 show a front side 20a and a rear side 20b of the vehicle body 20, respectively.

In the example shown in FIG. 3, it is assumed that the rear illumination unit 10 is attached to the ceiling of the vehicle body 20 of a minivan or a one-box car.

As shown in FIG. 3, a driver seat 22R and a passenger seat 22L are installed on a front side with respect to a center of the vehicle body 20. In addition, second row seats 23R and 23L and a third row seat 24 are disposed side by side on a rear side with respect to the center of the vehicle body 20.

Further, sliding doors 21L and 21R are disposed on left and right sides of the vehicle body 20, respectively. These sliding doors 21L and 21R are power sliding doors provided with a drive mechanism for electrically opening and closing the sliding doors. Rear portions of the sliding doors 21L and 21R are disposed to protrude outward from the vehicle body in an open state and to cover outer sides of rear portions of the vehicle body as shown by a broken line.

As shown in FIG. 3, the rear illumination unit 10 is installed in a central portion of the vehicle body 20 in the width direction, and is disposed to extend from the vicinity of a center of the vehicle body in a front-rear direction to a position close to the rear side 20b in a state where the front-rear direction of the vehicle body and the longitudinal direction AL of the rear illumination unit 10 coincide with each other.

<Details of Illumination Region>
<State Viewed from Front Side of Vehicle Body>

Figure 4A:
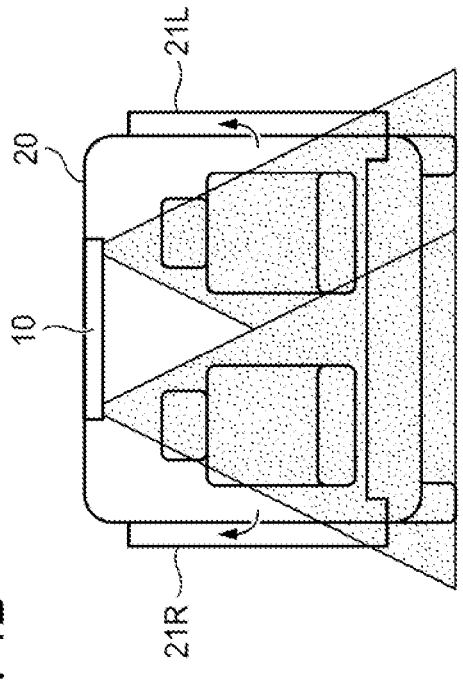
Figure 4B:
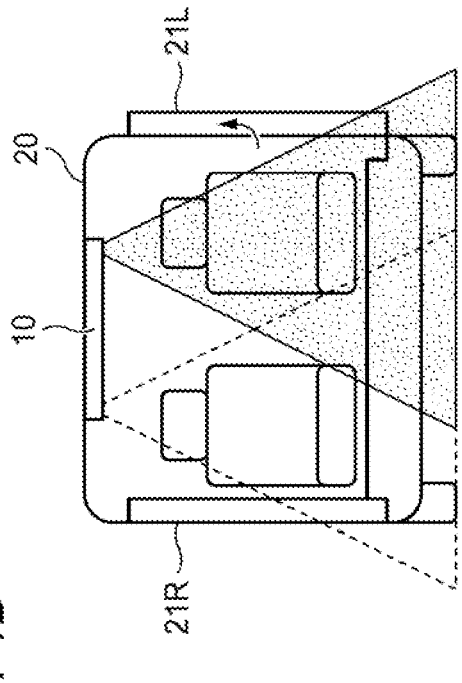
Figure 4C:
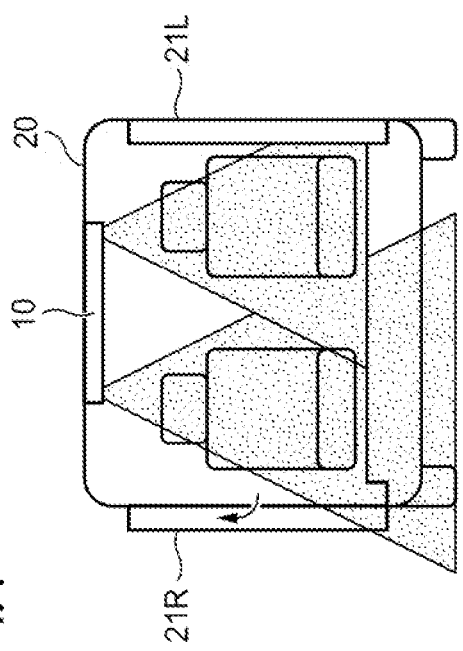
Figure 4D:
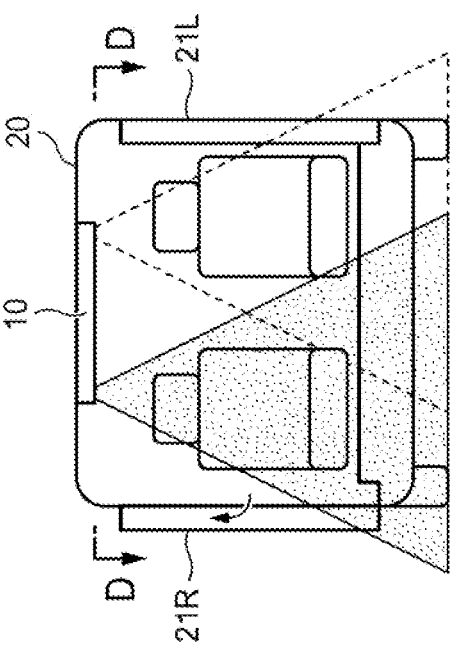

FIG. 4A to FIG. 4D show illumination regions of light sources in a cross section along a line A-A when the rear illumination unit 10 is viewed from the front side of the vehicle body 20. FIG. 4A shows a state when a right door is open, FIG. 4B shows a state when right and left doors are open, FIG. 4C shows a state when the right door is open, and FIG. 4D shows a state when the left door is open.

In a case of switching an illumination state of the rear illumination unit 10 including the light source lamp modules 11L and 11R disposed in two rows as shown in FIG. 1, the states shown in FIG. 4A and FIG. 4B can be obtained by turning on, for example, both the left and right light source lamp modules 11L and 11R. In addition, the state shown in FIG. 4C can be obtained by turning on only the light source lamp module 11R on the right side. Further, the state shown in FIG. 4D can be obtained by turning on only the light source lamp module 11L on the left side.

As shown in FIG. 4A and FIG. 4B, in this example, the illumination regions of the two rows of light source lamp modules 11L and 11R overlap each other near the center of left and right sides of the vehicle body. Therefore, for example, when the occupant moves near the center of the vehicle body, it is possible to brightly illuminate a portion such as the floor surface.

In addition, since an outer side of the illumination region illuminated by the light source lamp modules 11L and 11R extends to a position higher than a lower end of the sliding doors 21L and 21R, reflected light from the door can illuminate the vehicle passenger compartment brighter in a state where the door is closed.

Further, since the outer side of the illumination region illuminated by the light source lamp modules 11L and 11R extends to a position higher than the lower end of the sliding doors 21L and 21R, the illumination region is extended to the outer side of the vehicle body in a state where the door is open as shown in FIG. 4B, FIG. 4C, and FIG. 4D. That is, the rear illumination unit 10 can collectively illuminate a range including the region of feet and the ground such as a road when an occupant gets on and off. Therefore, it is not necessary to mount the vehicle with a special illumination device for illuminating the feet of the occupant when the occupant gets on and off.

<State Viewed from Side of Vehicle Body>

Figure 5A:
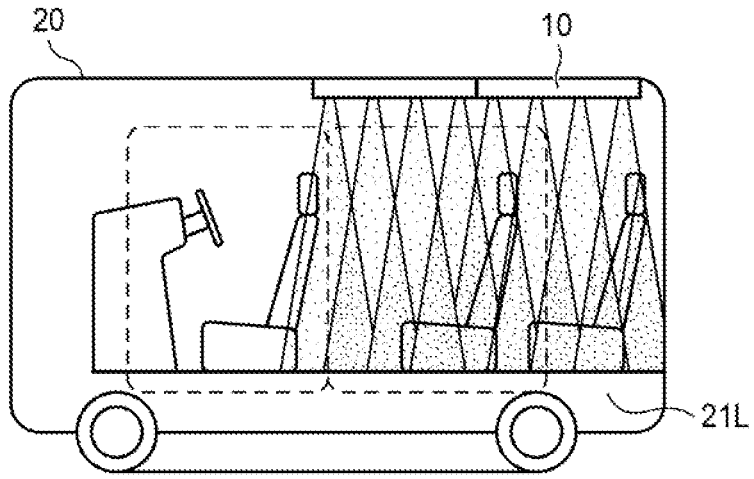
FIG. 5A, FIG. 5B, and FIG. 5C show cross-sectional views showing three types of illumination regions of the rear illumination unit when viewed from a cross section of a center of the vehicle body.
Figure 5B:
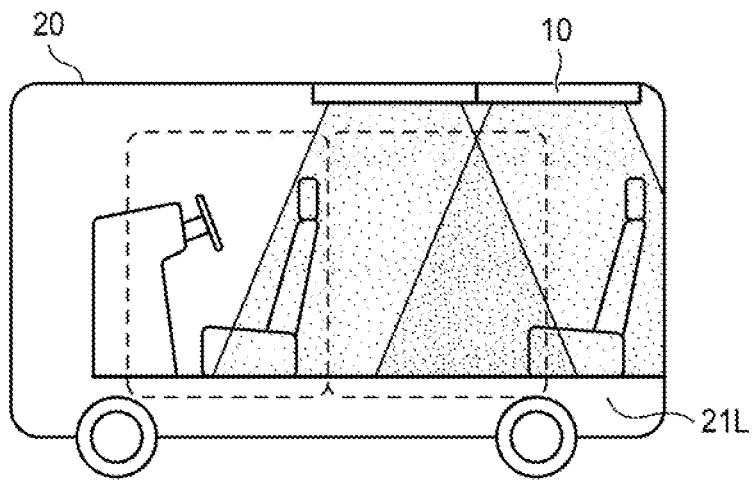
Figure 5C:
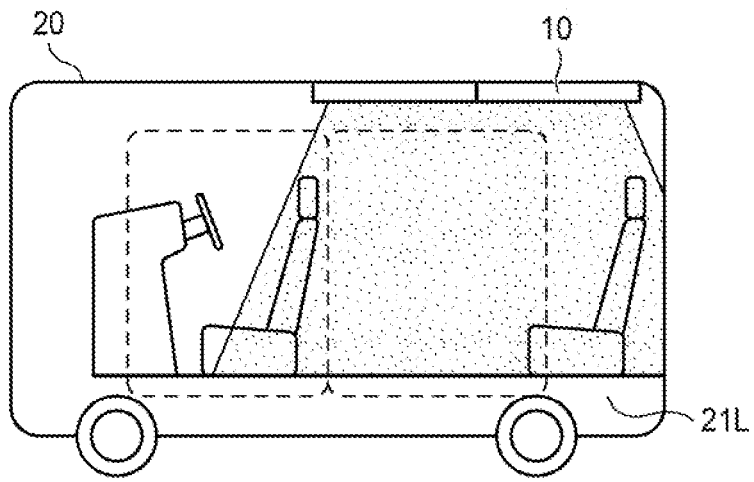

FIG. 5A to FIG. 5C show three types of illumination regions of the rear illumination unit 10 when viewed from a cross section (cross section along a line B-B) of the center of the vehicle body.

Even when the illumination region 17 of the light emitting element 12 on the rear illumination unit 10 is relatively narrow, for example, as shown in FIG. 5A, the illumination regions of the light emitting elements adjacent to each other overlap each other in a lower part of the vehicle passenger compartment. Therefore, brighter illumination can be implemented as compared with a case where only one light emitting element is turned on.

When the illumination region of the light emitting element 12 is expanded with respect to the state in FIG. 5A, the illumination regions 17 of three or more light emitting elements 12 overlap each other. Therefore, for example, the states shown in FIG. 5B and FIG. 5C can be obtained, and bright illumination with a small illuminance unevenness can be implemented.

<Sliding Door Open State>

Figure 6A:
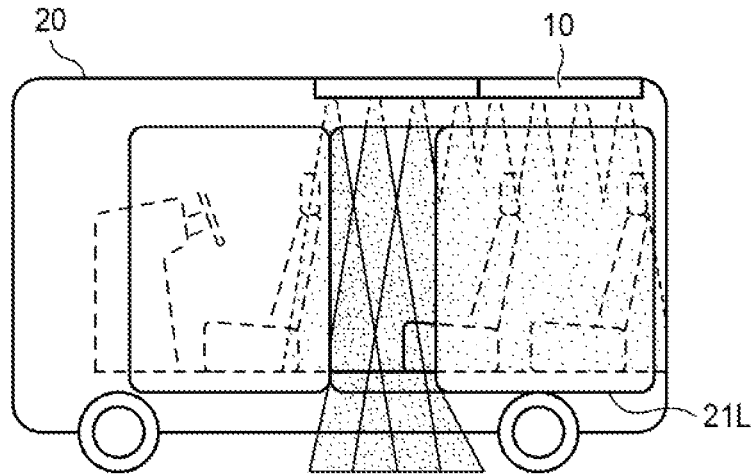
FIG. 6A, FIG. 6B, and FIG. 6C each show a cross-sectional view showing three types of illumination regions of the rear illumination unit when viewed from a cross section near a door of the vehicle body.
Figure 6B:
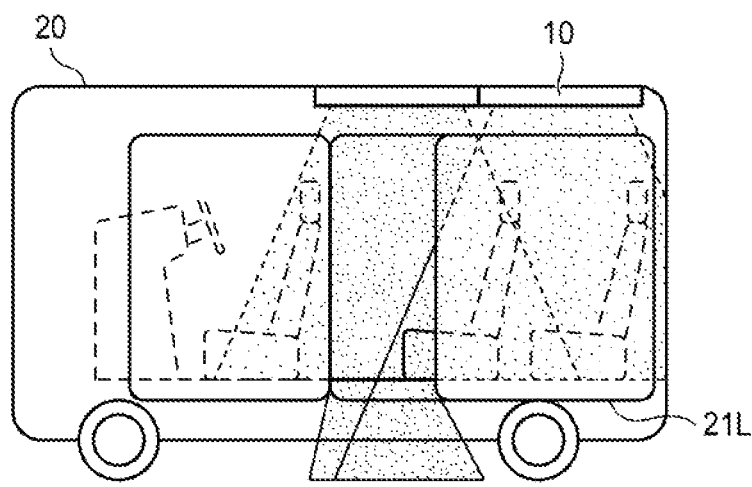
Figure 6C:
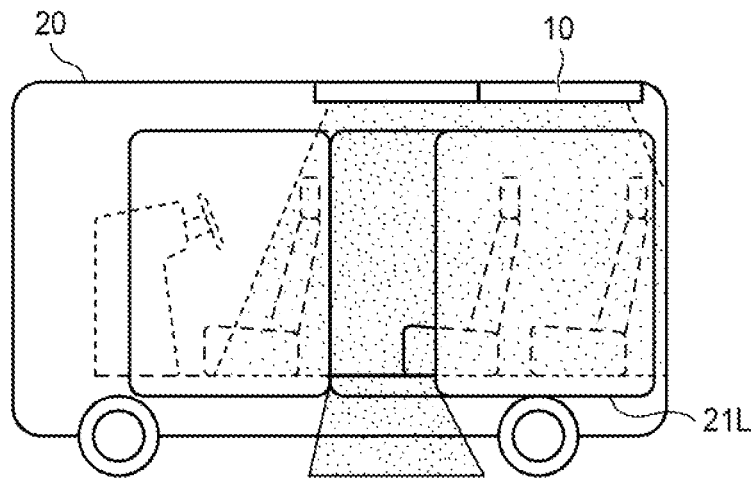

FIG. 6A to FIG. 6C show three types of illumination regions of the rear illumination unit 10 when viewed from a cross section (cross section along a line C-C) near the door of the vehicle body.

That is, when the sliding door 21L is in an open state in the states shown in FIG. 5A to FIG. 5C, the vicinity of the sliding door 21L is illuminated in the states shown in FIG. 6A to FIG. 6C.

When the rear illumination unit 10 is installed on the vehicle body 20, the illumination regions 17 of the plurality of light emitting elements 12 extend to the outer side of the vehicle body 20, and the illumination regions 17 of the plurality of adjacent light emitting elements overlap each other. Therefore, as shown in FIG. 6A to FIG. 6C, the rear illumination unit 10 alone can brightly illuminate a range of the feet of the occupant at the time of getting on and off, such as the floor surface of the vehicle passenger compartment, and steps and the ground when the occupant gets on and off. Therefore, it is not necessary to prepare a dedicated foot illumination device.

<Configuration of Rear Illumination Control Unit>

Figure 7:
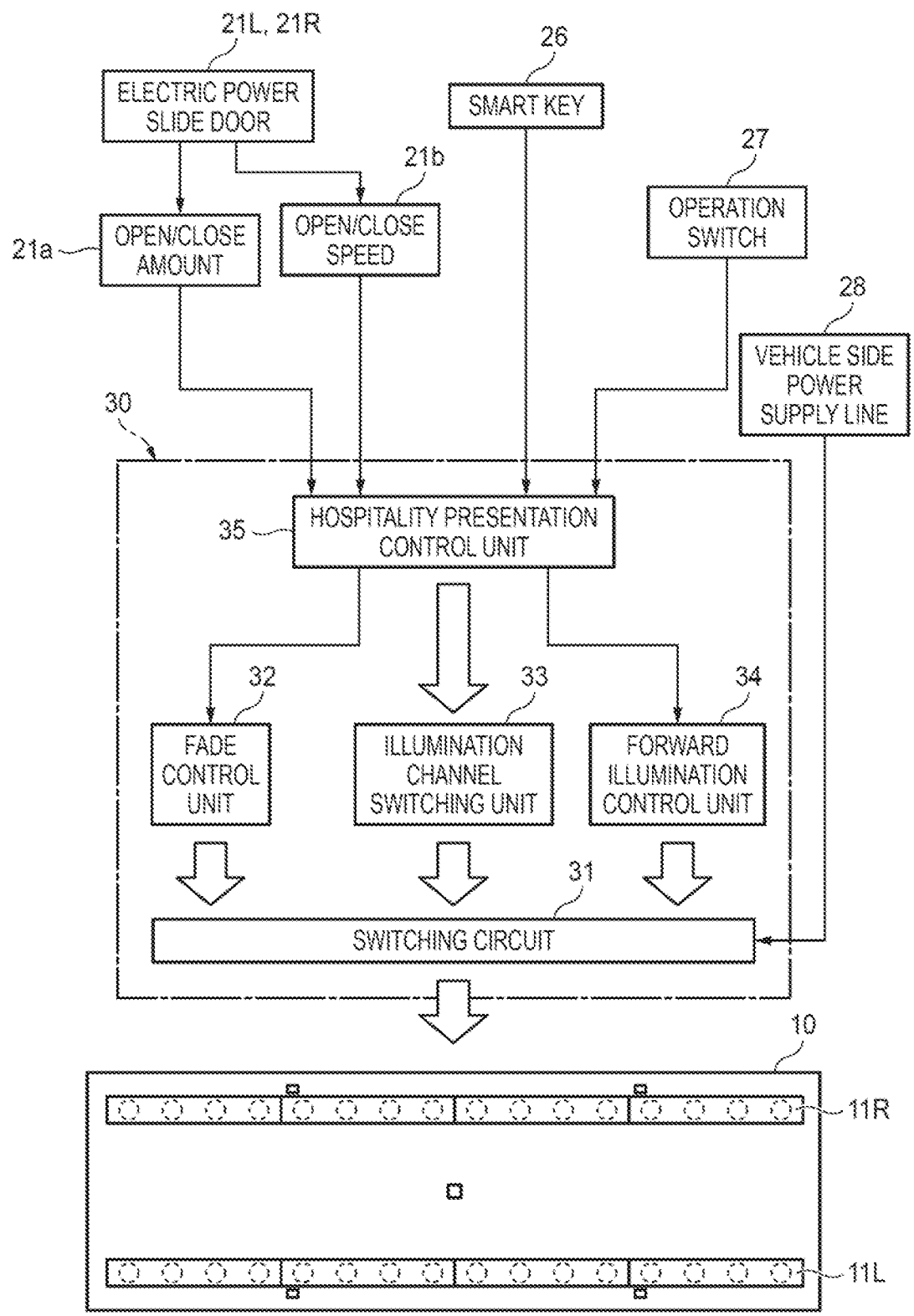
FIG. 7 is a block diagram showing a configuration example of a rear illumination control unit that controls the rear illumination unit.

FIG. 7 shows a configuration example of a rear illumination control unit 30 that controls the rear illumination unit 10.

The rear illumination control unit 30 shown in FIG. 7 can implement a special presentation function using illumination in order to provide hospitality to an occupant who is going to get on the vehicle and an occupant who is on the vehicle. That is, rather than simply turning the illumination on and off, it is possible to give a special presentation effect by accurately controlling the illumination state.

Specifically, illumination patterns can be sequentially switched according to an open/close speed and an open/close amount of an electric power sliding door. In addition, a special fade—in control can be performed when the illumination starts to turn on, and a special fade-out control can be performed when the illumination turns off. Further, a forward illumination control can be performed such that light sources in a plurality of regions are sequentially turned on/off. Furthermore, various control elements can be coordinated with each other for presentation.

The rear illumination control unit 30 shown in FIG. 7 includes a switching circuit 31, a fade control unit 32, an illumination channel switching unit 33, a forward illumination control unit 34, and a hospitality presentation control unit 35.

The switching circuit 31 incorporates a large number of switching devices capable of controlling energization of the light emitting elements 12 in the rear illumination unit 10, and can perform an energization on/off control for each illumination channel. Further, the switching circuit 31 also has a function of adjusting brightness in the illumination by switching an on/off duty.

Since the light source lamp modules 11L and 11R of the rear illumination unit 10 are each mounted with 16 independent light emitting elements 12, a total of 32 controllable light emitting elements 12 are provided in the rear illumination unit 10.

For example, when the switching circuit 31 has a circuit configuration capable of individually energization-controlling the 32 light emitting elements 12 one by one, a maximum of 32 illumination channels can be formed. That is, one or a plurality of light emitting elements 12 can be individually controlled to be on and off in an independent state for each illumination channel. Therefore, by switching the illumination channel, it is possible to change the position of the illumination and the size of the range as appropriate.

Actually, the number of illumination channels may be reduced due to restrictions such as simplification of the circuit configuration of the switching circuit 31. For example, a group of two light emitting elements 12 may be configured as an independent series circuit to reduce the maximum number of illumination channels to 16, or a group of four light emitting elements 12 may be configured as an independent series circuit to reduce the maximum number of illumination channels to 8.

When a plurality of illumination channels are logically combined, it is possible to reduce the number of controllable illumination channels without changing the circuit configuration of the switching circuit 31.

The illumination channel switching unit 33 has a function of appropriately selecting a correspondence between an illumination control pattern and the plurality of illumination channels.

The fade control unit 32 can perform a fade—in control such that the brightness gradually increases at the start of illumination by, for example, by controlling the duty of an energization time for each light emitting element 12. In addition, a fade-out control can be performed such that the brightness gradually decreases when the illumination is turned off.

The forward illumination control unit 34 can perform a control to switch and turn on, in a chronological order, illumination channels selected sequentially in an arrangement order from the light emitting elements 12 of the plurality of illumination channels arranged in a row.

The hospitality presentation control unit 35 grasps a latest state of the vehicle based on information such as states of the sliding doors 21L and 21R detected by an open/close amount detection unit 21a and an open/close speed detection unit 21b, a state of a smart key 26, and a state of an operation switch 27, and selects an illumination control pattern for the presentation necessary to implement appropriate hospitality to the occupant. In order to implement the selected control pattern, the illumination of the rear illumination unit 10 is appropriately controlled by using the fade control unit 32, the illumination channel switching unit 33, and the forward illumination control unit 34.

<Configuration of Entire In-Vehicle Illumination System>

Figure 8:
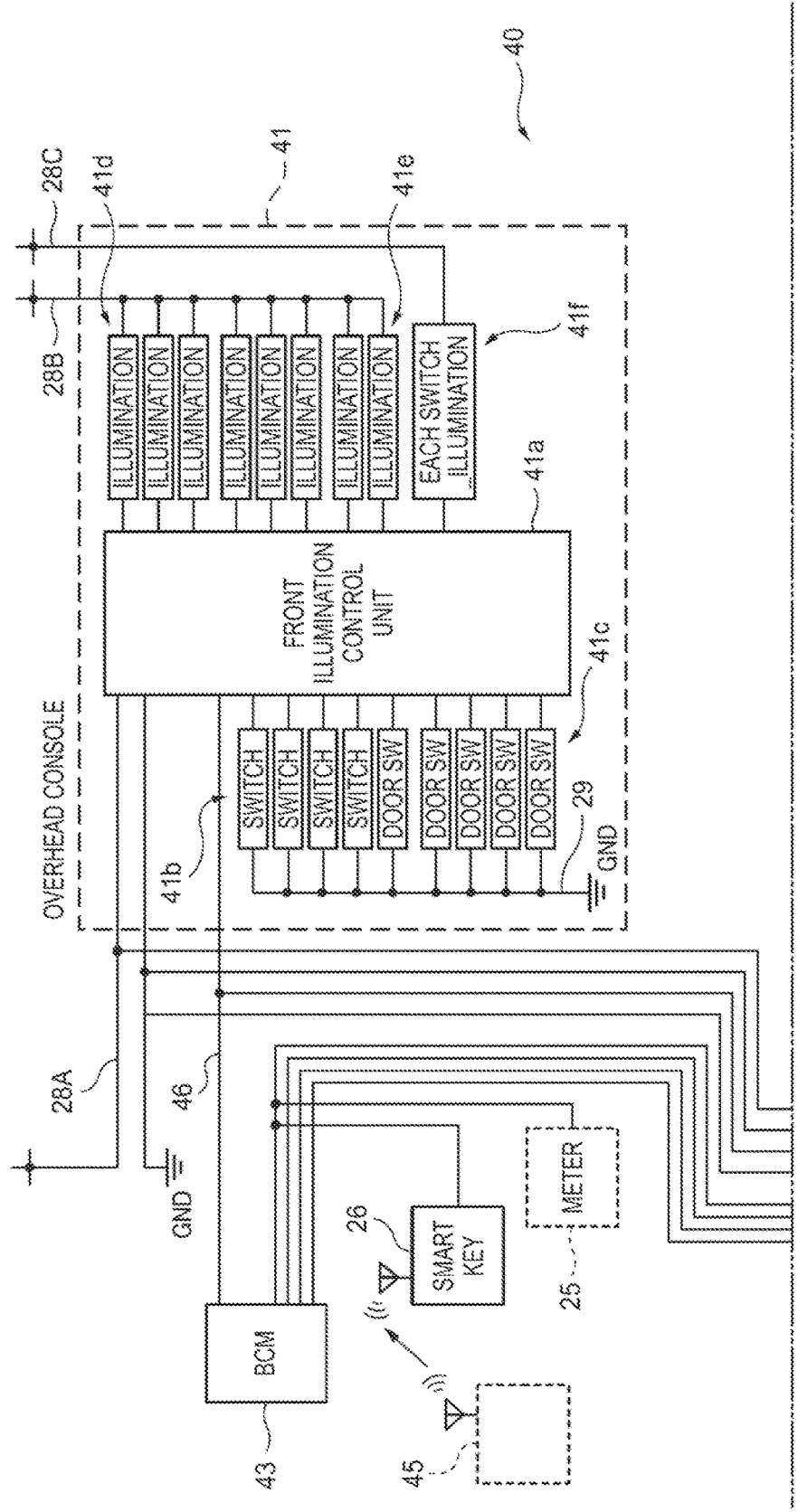
FIG. 8 is an electric circuit diagram showing a configuration example of an entire in-vehicle illumination system including the rear illumination unit.

FIG. 8 shows a configuration example of an entire in-vehicle illumination system including the rear illumination unit 10.

An illumination system 40 shown in FIG. 8 includes a front illumination unit 41 disposed on the front side of the vehicle body 20 and a rear illumination unit 42 disposed on the rear side of the vehicle body 20. The rear illumination unit 42 in FIG. 8 corresponds to the rear illumination unit 10 shown in FIG. 1. The front illumination unit 41 is configured as an overhead console (OHC).

The front illumination unit 41 and the rear illumination unit 42 are separately connected to a master control unit 43 via a multiplex communication line 46. The multiplex communication line 46 supports communication such as Clock Extension Peripheral Interface (CXPI). The master control unit 43 is an electronic control unit (Body Control Module: BCM) on a master side assigned to control the body system of the vehicle, and is located in a rank higher than that of the front illumination unit 41 and the rear illumination unit 42.

The master control unit 43 can collect information from the front illumination unit 41 and the rear illumination unit 42 via the multiplex communication line 46 to grasp a situation. In addition, the master control unit 43 can give an illumination instruction to the front illumination unit 41 and the rear illumination unit 42 via the multiplex communication line 46.

ECUs of the sliding doors 21L and 21R, a meter unit 25, a door switch 44, and an ECU of the smart key 26 are connected to the master control unit 43 via a CAN communication bus 47. When a predetermined electronic key 45 approaches, the smart key 26 can receive a radio signal transmitted from the electronic key 45 and execute a collation process.

The master control unit 43 in FIG. 8 can execute the hospitality function in the same manner as the hospitality presentation control unit 35 shown in FIG. 7. That is, the master control unit 43 can determine the necessity of hospitality based on the states of the sliding doors 21L and 21R, the state of the smart key 26, and vehicle information output from the meter unit 25, and give an appropriate instruction for hospitality to the front illumination unit 41 and the rear illumination unit 42.

The front illumination unit 41 includes a front control unit 41a, an operation switch unit 41b, a door switch unit 41c, a front lamp unit 41d, a front illumination unit 41e, and an illumination switch unit 41f.

The front control unit 41a is a slave control unit located in a rank lower than that of the master control unit 43, and performs an appropriate front-side illumination control based on an instruction from the master control unit 43, various detected signals, and various information.

The operation switch unit 41b includes a switch for operating each of left and right illumination individually, a switch linked to door open, and a switch for operating all illumination.

The door switch unit 41c includes a switch for individually operating the "open" and "close" of each of the sliding doors 21R and 21L.

The front lamp unit 41d includes three illumination lamps disposed on a right side of the front and three illumination lamps disposed on a left side of the front.

The front illumination unit 41e includes illumination lamps disposed on left and right sides of the front.

The illumination switch unit 41f includes a switch for operating an illumination lamp.

The rear illumination unit 42 includes a rear control unit 42a, an operation switch unit 42b, a door switch unit 42c, a right-row lamp unit 42d, a left-row lamp unit 42e, an illumination lamp unit 42f, and an illumination switch unit 42g.

The rear control unit 42a is a slave control unit located in a rank lower than that of the master control unit 43, and performs an appropriate rear-side illumination control based on an instruction from the master control unit 43, various detected signals, and various information.

The rear control unit 42a selects an illumination pattern of the hospitality based on contents of a control table stored in advance according to an instruction from the master control unit 43, and executes the selected appropriate hospitality control.

For example, the rear control unit 42a sequentially turns on the illumination of the rear illumination unit 10 according to an open speed of the sliding door 21L or 21R. When the occupant approaches the vehicle by unlocking the door and holding the key, the rear illumination unit 10 is controlled such that the illumination of the rear illumination unit 10 is slightly turned on, and after the door is open, a plurality of regions are sequentially lit by switching to a state of increasing the brightness.

The operation switch unit 42b includes illumination switches 14L, 14R, 15L, and 15R and the full illumination switch 16 shown in FIG. 1.

The door switch unit 42c includes a switch for individually instructing "open" and "close" of each of the sliding doors 21L and 21R.

The right-row lamp unit 42d includes 16 light emitting elements 12 constituting the right-row light source lamp module 11R shown in FIG. 1. In the configuration example shown in FIG. 8, since a group of two light emitting elements 12 are connected in series, the number of illumination channels of the light source lamp module 11R that can be individually controlled by the rear control unit 42a is about 8.

The left-row lamp unit 42e includes 16 light emitting elements 12 constituting the left-row light source lamp module 11L shown in FIG. 1. In the configuration example shown in FIG. 8, since a group of two light emitting elements 12 are connected in series, the number of illumination channels of the light source lamp module 11L that can be individually controlled by the rear control unit 42a is about 8.

The illumination lamp unit 42f includes a plurality of illumination lamps disposed on a left side and a right side of the rear.

The illumination switch unit 42g includes a switch for operating a rear illumination lamp.

<Dynamic Transition of Illumination State>

Figure 9:
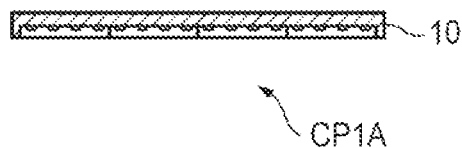
FIG. 9 is a state transition diagram showing a state transition of the illumination region when the rear illumination unit is controlled by a first control pattern.
Figure 9:
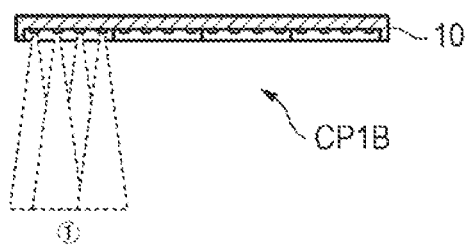
Figure 9:
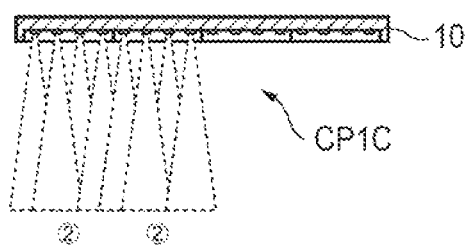
Figure 9:
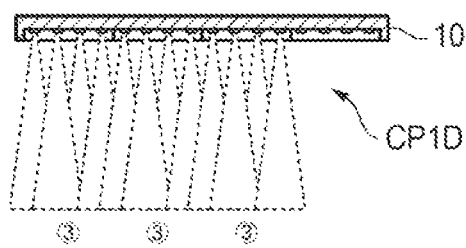
Figure 9:
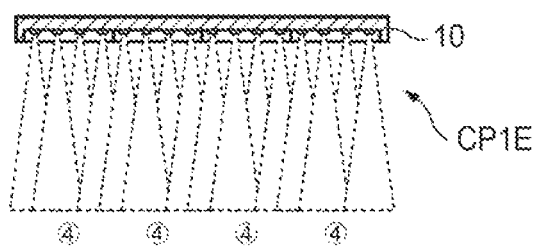

FIG. 9 to FIG. 1S show dynamic transitions of the illumination state in seven types of control patterns CP1 to CP7 that can be implemented by using the rear illumination unit 10 shown in FIG. 1 and the rear illumination control unit 30 in FIG. 7. These control patterns may be applied to only one of the two rows of light source lamp modules 11L and 11R, or may be applied to both at the same time. The control patterns CP1 to CP7 when controlling the left-row light source lamp module 11L will be described below.

<Control Pattern CP1>

In the control pattern CP1, illumination states CP1A, CP1B, CP1C, CP1D, and CP1E shown in FIG. 9 are sequentially switched.

In the first illumination state CP1A, all the light emitting elements 12 of the light source lamp module 11L are in an off state, that is, in a non-energized state.

In the illumination state CP1B next, as first illumination adjustment 1, four light emitting elements 12 on the front side (left side in FIG. 9), that is, all the light emitting elements 12 in the module region 11La are switched from the off state to an on state.

In the illumination state CP1C next, as second illumination adjustment 2, four, i.e., the fifth to eighth light emitting elements 12 on the front side, that is, all the light emitting elements 12 in the module region 11Lb are switched from the off state to an on state.

In the illumination state CP1D next, as third illumination adjustment 3, four, i.e., the ninth to twelfth light emitting elements 12 on the front side, that is, all the light emitting elements 12 in the module region 11Lc are switched from the off state to an on state.

In the illumination state CP1E next, as fourth illumination adjustment 4, four, i.e., the thirteenth to sixteenth light emitting elements 12 on the front side, that is, all the light emitting elements 12 in the module region 11Ld are switched from the off state to an on state.

That is, for example, every time a certain period of time elapses from the illumination state CP1A, or in a state linked to the open/close position and the open/close speed of the sliding door, by controlling the energization of the rear illumination control unit 30 so as to sequentially transition to the illumination states CP1B, CP1C, CP1D, and CP1E, it is possible to implement characteristic hospitality presentation using illumination.

<Control Pattern CP2>

Figure 10:
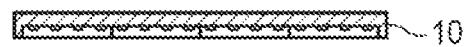
FIG. 10 is a state transition diagram showing a state transition of the illumination region when the rear illumination unit is controlled by a second control pattern.
Figure 10:
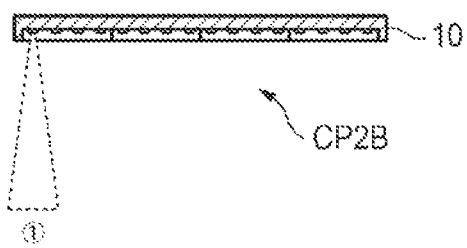
Figure 10:
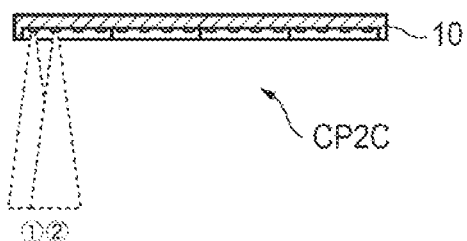
Figure 10:
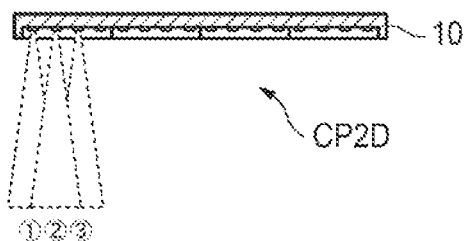
Figure 10:
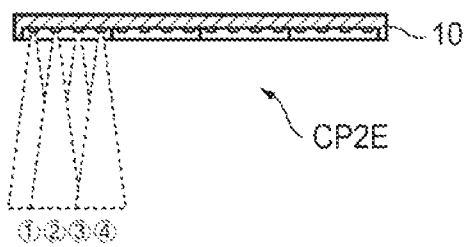
Figure 11:
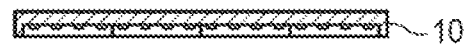
FIG. 11 is a state transition diagram showing a state transition of the illumination region when the rear illumination unit is controlled by a third control pattern.
Figure 11:
Figure 11:
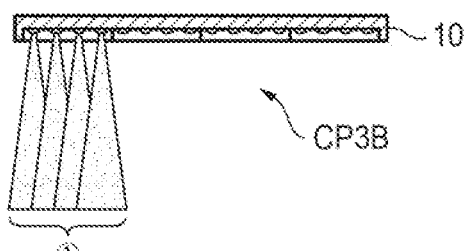
Figure 11:
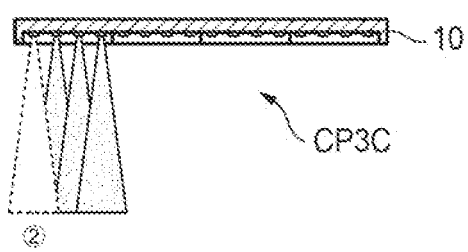
Figure 11:
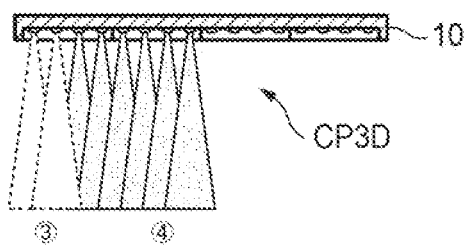
Figure 11:
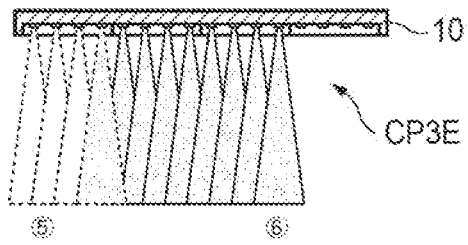

In the control pattern CP2, illumination states CP2A, CP2B, CP2C, CP2D, and CP2E shown in FIG. 10 are sequentially switched.

In the first illumination state CP2A, all the light emitting elements 12 of the light source lamp module 11L are in an off state, that is, in a non-energized state.

In the illumination state CP2B next, as first illumination adjustment 1, only one light emitting element 12 on the foremost side is switched from the off state to an on state.

In the illumination state CP2C next, as second illumination adjustment 2, only the second light emitting element 12 on the front side is switched from the off state to an on state.

In the illumination state CP2D next, as third illumination adjustment 3, only the third light emitting element 12 on the front side is switched from the off state to an on state.

In the illumination state CP2E next, as fourth illumination adjustment 4, only the fourth light emitting element 12 on the front side is switched from the off state to an on state.

<Control Pattern CP3>

In the control pattern CP3, illumination states CP3A, CP3B, CP3C, CP3D, CP3E, and CP3F shown in FIG. 1I are sequentially switched.

In the first illumination state CP3A, all the light emitting elements 12 of the light source lamp module 11L are in an off state, that is, in a non-energized state.

In the illumination state CP3B next, as first illumination adjustment 1, four light emitting elements 12 on the front side, that is, all the light emitting elements 12 in the module region 11La are switched from the off state to a dimly on state. For example, by energizing each light emitting element 12 with a duty of about 50%, it is possible to emit light dimly.

In the illumination slate CP3C next, as second illumination adjustment 2, only the on state of the first light emitting element 12 on the front side is switched from a dim state to a state of increasing a light amount (for example, an energization duty of 100%).

In the illumination state CP3D next, as third illumination adjustment 3, only the on state of the second light emitting element 12 on the front side is switched from a dim state to a state of increasing a light amount. At the same time, as fourth illumination adjustment 4, the four light emitting elements 12 in the module region 11Lb are switched from the off state to a dimly on state.

In the illumination state CP3E next, as fifth illumination adjustment 5, only the on state of the third light emitting element 12 on the front side is switched from a dim state to a state of increasing a light amount. At the same time, as sixth illumination adjustment 6, the four light emitting elements 12 in the module region 11Lc are switched from the off state to a dimly on state.

In the illumination state CP3F next, as seventh illumination adjustment 7, only the on state of the fourth light emitting element 12 on the front side is switched from a dim state to a state of increasing a light amount. At the same time, as eighth illumination adjustment 8, the four light emitting elements 12 in the module region 11Ld are switched from the off state to a dimly on state.

<Control Pattern CP4>

Figure 12:
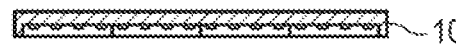
FIG. 12 is a state transition diagram showing a state transition of the illumination region when the rear illumination unit is controlled by a fourth control pattern.
Figure 12:
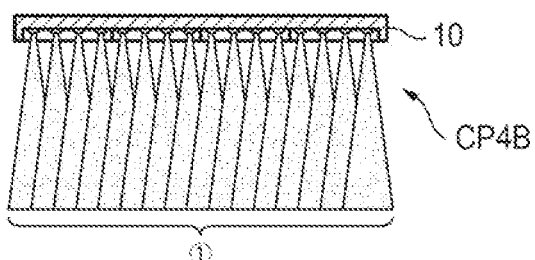
Figure 12:
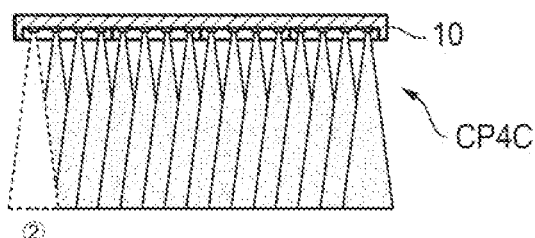
Figure 12:
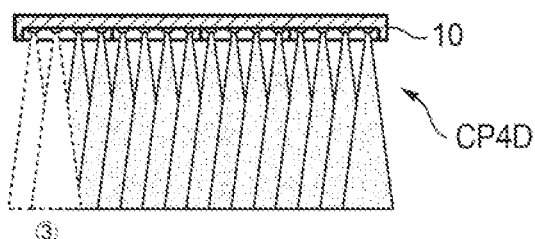
Figure 12:
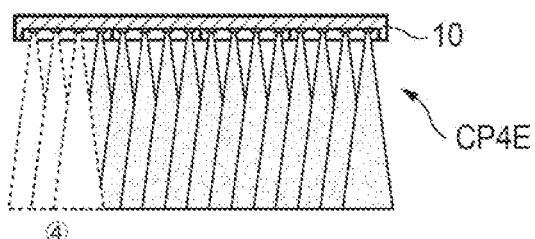
Figure 12:
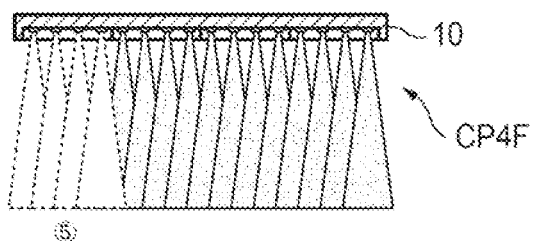

In the control pattern CP4, illumination states CP4A, CP4B, CP4C, CP4D, CP4E, and CP4F shown in FIG. 12 are sequentially switched.

In the first illumination state CP4A, all the light emitting elements 12 of the light source lamp module 11L are in an off state, that is, in a non-energized state.

In the illumination state CP4B next, as first illumination adjustment 1, all the 16 light emitting elements 12 of the light source lamp module 11L are switched from an off state to a dimly on state.

In the illumination state CP4C next, as second illumination adjustment 2, only the on state of the first light emitting element 12 on the front side is switched from a dim state to a state of increasing a light amount (for example, an energization duty of 100%).

In the illumination state CP4D next, as third illumination adjustment 3, only the on state of the second light emitting element 12 on the front side is switched from a dim state to a state of increasing the light amount.

In the illumination state CP4E next, as fourth illumination adjustment 4, only the on state of the third light emitting element 12 on the front side is switched from a dim state to a state of increasing the light amount.

In the illumination state CP4F next, as fifth illumination adjustment 5, only the on state of the fourth light emitting element 12 on the front side is switched from a dim state to a state of increasing the light amount.

<Control Pattern CP5>

Figure 13:
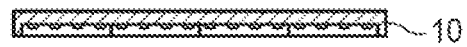
FIG. 13 is a state transition diagram showing a state transition of the illumination region when the rear illumination unit is controlled by a fifth control pattern.
Figure 13:
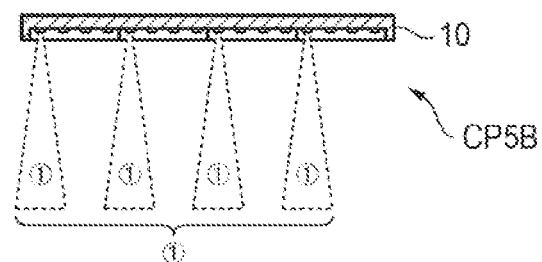
Figure 13:
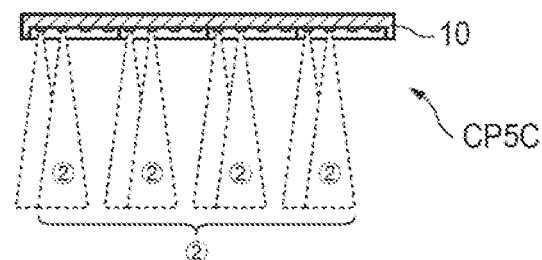
Figure 13:
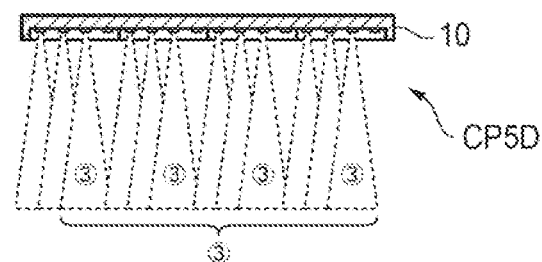
Figure 13:
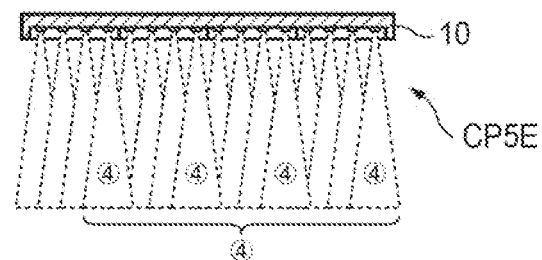

In the control pattern CP5, illumination states CP5A, CP5B, CP5C, CP5D, and CP5E, shown in FIG. 13 are sequentially switched.

In the first illumination state CP5A, all the light emitting elements 12 of the light source lamp module 11L are in an off state, that is, in a non-energized state.

In the illumination state CP5B next, as first illumination adjustment 1, four, i.e., the first, fifth, ninth, and thirteenth light emitting elements 12 on the front side are switched from the off state to an on state.

In the illumination state CP5C next, as second illumination adjustment 2, four, i.e., the second, sixth, tenth, and fourteenth light emitting elements 12 on the front side are switched from the off state to an on state.

In the illumination state CP5D next, as third illumination adjustment 3, four, i.e., the third, seventh, eleventh, and fifteenth light emitting elements 12 on the front side are switched from the off state to an on state.

In the illumination state CP5E next, as fourth illumination adjustment 4, four, i.e., the fourth, eighth, twelfth, and sixteenth light emitting elements 12 on the front side are switched from the off state to an on state.

<Control Pattern CP6>

Figure 14:
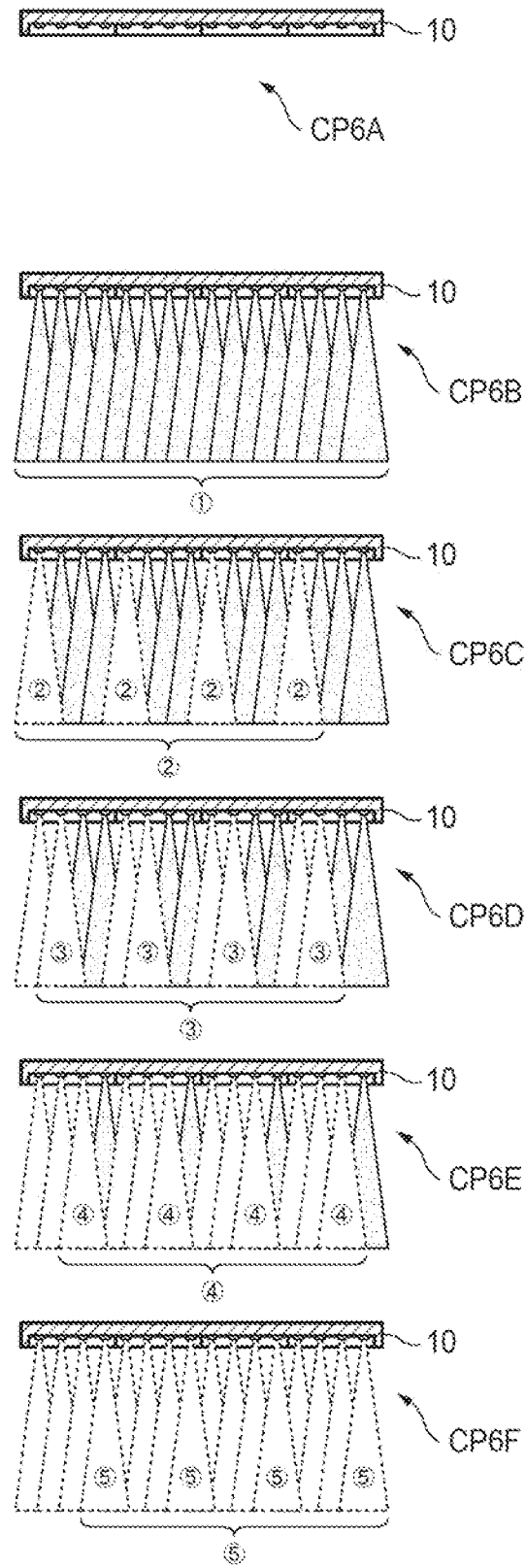
FIG. 14 is a state transition diagram showing a state transition of the illumination region when the rear illumination unit is controlled by a sixth control pattern.

In the control pattern CP6, illumination states CP6A, CP6B, CP6C, CP6D, CP6E, and CP6F shown in FIG. 14 are sequentially switched.

In the first illumination state CP6A, all the light emitting elements 12 of the light source lamp module 11L are in an off state, that is, in a non-energized state.

In the illumination state CP6B next, as first illumination adjustment 1, all the 16 light emitting elements 12 of the light source lamp module 11L are switched from an off state to a dimly on state.

In the illumination state CP6C next, as second illumination adjustment 2, four, i.e., the first, fifth, ninth, and thirteenth light emitting elements 12 on the front side are switched from a dim state to a state of increasing a light amount (for example, an energization duty of 100%).

In the illumination state CP6D next, as third illumination adjustment 3, four, i.e., the second, sixth, tenth, and fourteenth light emitting elements 12 on the front side are switched from a dim state to a state of increasing a light amount.

In the illumination state CP6E next, as fourth illumination adjustment 4, four, i.e., the third, seventh, eleventh, and fifteenth light emitting elements 12 on the front side are switched from a dim state to a state of increasing a light amount.

In the illumination state CP6F next, as fifth illumination adjustment 5, four, i.e., the fourth, eighth, twelfth, and sixteenth light emitting elements 12 on the front side are switched from a dim state to a state of increasing a light amount.

<Control Pattern CP7>

Figure 15:
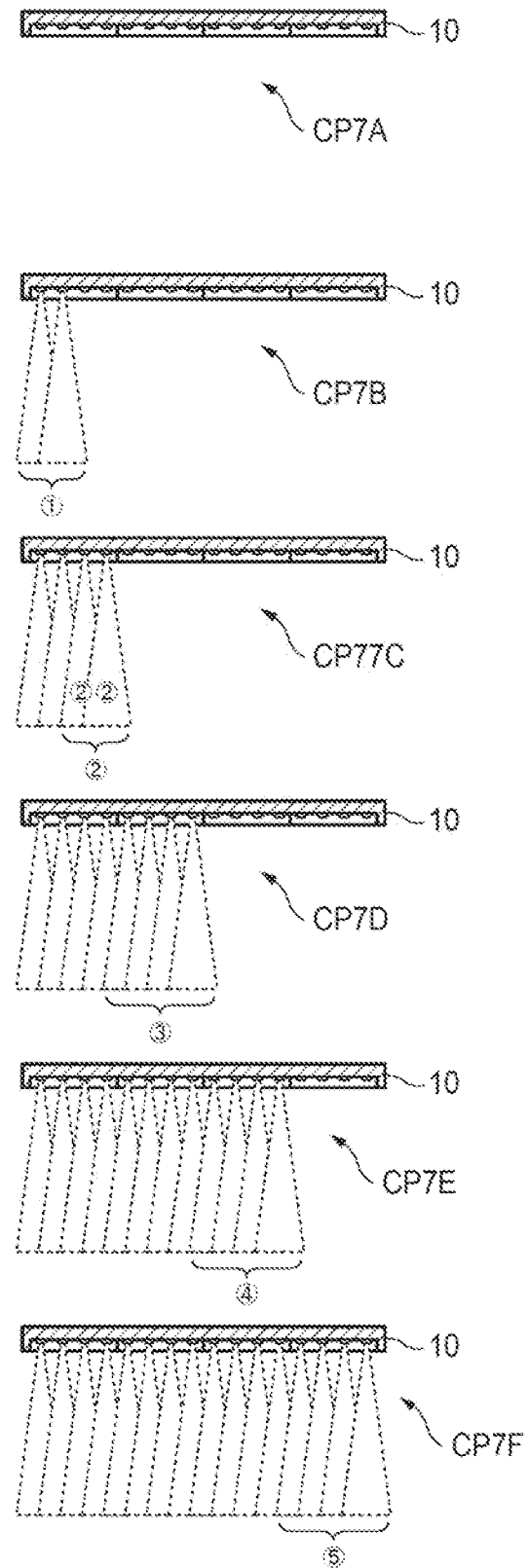
FIG. 15 is a state transition diagram showing a state transition of the illumination region when the rear illumination unit is controlled by a seventh control pattern.

In the control pattern CP7, illumination states CP7A, CP7B, CP7C, CP7D, CP7E, and CP7F shown in FIG. 15 are sequentially switched.

In the first illumination state CP7A, all the light emitting elements 12 of the light source lamp module 11L are in an off state, that is, in a non-energized state.

In the illumination state CP7B next, as first illumination adjustment 1, two, i.e., the first and second light emitting elements 12 on the front side are switched from the off state to an on state.

In the illumination state CP7C next, as second illumination adjustment 2, two, i.e., the third and fourth light emitting elements 12 on the front side are switched from the off state to an on state.

In the illumination state CP7D next, as third illumination adjustment 3, four, i.e., the fifth to eighth light emitting elements 12 on the front side are switched from the off state to an on state.

In the illumination state CP7E next, as fourth illumination adjustment 4, four, i.e., the ninth to twelfth light emitting elements 12 on the front side are switched from the off state to an on state.

In the illumination state CP7F next, as fifth illumination adjustment 5, four, i.e., the thirteenth to sixteenth light emitting elements 12 on the front side are switched from the off state to an on state.

<Relationship between Circuit Connection and Illumination Channel>

FIG. 16 shows a list of a relationship between a plurality of types of circuit connection patterns and controllable channels in the light source lamp module 11L in the rear illumination unit 10. The content in FIG. 16 also applies to the light source lamp module 11R.

In FIG. 16, the 16 light emitting elements 12 included in the light source lamp module 11L are indicated as "A", "B", "C", "D", "E", "F", "G", "H", "I", "J", "K", "L", "M", "N", "O", and "P".

By partially sharing the control of energization of these 16 light emitting elements "A" to "P", it is possible to simplify the circuit configuration and the content of the control. For example, when every two light emitting elements are grouped as in the left-row lamp unit 42e shown in FIG. 8 and two light emitting elements are connected in series in each group, the 16 light emitting elements "A" to "P" can be grouped into 8 systems. Then, an on/off control of energization is standardized for each group in the eight systems. In this case, the number of channels of the light source lamp module 11L that can be controlled by the rear illumination control unit 30 is 8.

As a typical circuit connection pattern PC for grouping the 16 light emitting elements "A" to "P", for example, 13 types of circuit connection patterns PC1 to PC13 shown in FIG. 16 can be assumed. In FIG. 16, each of the independently controllable groups is represented by a single "o".

In the example shown in FIG. 16, in the circuit connection pattern PC1, energization controls of the 16 light emitting elements "A" to "P" are all independent. Therefore, the number of controllable channels Nch in the circuit connection pattern PC1 is 16 (the number of 0 is 16).

In the circuit connection pattern PC2, among the 16 light emitting elements "A" to "P", two light emitting elements at adjacent positions belong to a common group. Therefore, there are eight groups whose energization can be independently controlled, and the number of channels Nch is 8.

In the circuit connection pattern PC3, similar to region division of the module regions 11La, 11Lb, 11Lc, and 11Ld shown in FIG. 1, four light emitting elements belong to a common group. Therefore, there are four groups whose energization can be independently controlled, and the number of channels Nch is 4.

In the circuit connection pattern PC4, in the light source lamp module 11L, a group of eight light emitting elements "A" to "H" on the front side and a group of eight light emitting elements "I" to "P" on the rear side are independent of each other. Therefore, there are two groups whose energization can be independently controlled, and the number of channels Nch is 2.

In the circuit connection pattern PC5, in the light source lamp module 11L, the eight light emitting elements "A" to "H" on the front side are independent one by one, and the four light emitting elements "I" to "L" and the four light emitting elements "M" to "P" on the rear side form independent groups. Therefore, there are ten groups whose energization can be independently controlled, and the number of channels Nch is 10.

In the circuit connection pattern PC6, the four light emitting elements "A" to "D" are independent one by one, and the two light emitting elements "E" and "F", the two light emitting elements "G" and "H", the four light emitting elements "I" to "L", and the four light emitting elements "M" to "P" form independent groups. Therefore, there are eight groups whose energization can be independently controlled, and the number of channels Nch is 8.

In the circuit connection pattern PC7, the two light emitting elements "A" and "B" are independent from each other, and the two light emitting elements "C" and "D", the two light emitting elements "E" and "F", the two light emitting elements "G" and "H", the four light emitting elements "I" to "L", and the four light emitting elements "M" to "P" form independent groups. Therefore, there are seven groups whose energization can be independently controlled, and the number of channels Nch is 7.

In the circuit connection pattern PC8, the two light emitting elements "A" and "B", the two light emitting elements "C" and "D", the two light emitting elements "E" and "F", the two light emitting elements "G" and "H", the four light emitting elements "I" to "L", and the four light emitting elements "M" to "P" form independent groups. Therefore, there are six groups whose energization can be independently controlled, and the number of channels Nch is 6.

In the circuit connection pattern PC9, the two light emitting elements "A" and "B", the two light emitting elements "C" and "D", the two light emitting elements "E" and "F", the two light emitting elements "G" and "H", and the eight light emitting elements "I" to "P" form independent groups. Therefore, there are five groups whose energization can be independently controlled, and the number of channels Nch is 5.

In the circuit connection pattern PC10, the four light emitting elements "A" to "D" are independent one by one, and the four light emitting elements "E" to "H", the four light emitting elements "I" to "L", and the four light emitting elements "M" to "P" form independent groups. Therefore, there are seven groups whose energization can be independently controlled, and the number of channels Nch is 7.

In the circuit connection pattern PC11, the two light emitting elements "A" and "B" are independent from each other, and the two light emitting elements "C" and "D", the four light emitting elements "E" to "H", the four light emitting elements "I" to "L", and the four light emitting elements "M" to "P" form independent groups. Therefore, there are six groups whose energization can be independently controlled, and the number of channels Nch is 6.

In the circuit connection pattern PC12, the two light emitting elements "A" and "B", the two light emitting elements "C" and "D", the four light emitting elements "E" to "H", the four light emitting elements "I" to "L", and the four light emitting elements "M" to "P" form independent groups. Therefore, there are live groups whose energization can be independently controlled, and the number of channels Nch is 5.

In the circuit connection pattern PC13, the first light emitting element "A" is independent, and the two light emitting elements "B" and "C", the three light emitting elements "D" to "F", the four light emitting elements "G" to "J", and the six light emitting elements "K" to "P" form independent groups. Therefore, there are five groups whose energization can be independently controlled, and the number of channels Nch is 5.

When the number of controllable channels Nch is large, for example, as in the circuit connection pattern PC1, by logically combining a plurality of light emitting elements or a plurality of groups whose energization can be controlled without changing the circuit configuration in the switching circuit 31, the circuit connection patterns PC2 to PC13 shown in FIG. 16 can be selected as needed. Such a function can be included in the illumination channel switching unit 33. However, as the number of channels increases, the number of switching elements required by the switching circuit 31 increases, and the circuit configuration is complicated.

The correspondence between the control patterns CP1 to CP7 shown in FIG. 9 to FIG. 15 and the circuit connection patterns PC1 to PC13 is as follows.

Circuit connection pattern PC1: can implement control patterns CP5 and CP6

Circuit connection pattern PC3: can implement control pattern CP1

Circuit connection pattern PC10: can implement control patterns CP2, CP3 and CP4

Circuit connection pattern PC12: can implement control pattern CP7

As described above, when the rear illumination unit 10 shown in FIG. 1 is disposed in the vehicle passenger compartment as shown in FIG. 3, it is possible to brightly illuminate the vehicle passenger compartment as shown in FIG. 2 to FIG. 5. That is, since the illumination ranges of the left and right light source lamp modules 11L and 11R overlap in a region such as the central floor surface in the left-right direction, the brightness of the illumination in a central aisle or the like can be improved.

In addition, since the illumination range of the left and right light source lamp modules 11L and 11R extends from the lower side to the upper side of the door as shown in FIG. 4, the region around the door can be brightly illuminated, and the region of feet and the ground when the occupant gets on and off can be illuminated.

Since each of the light source lamp modules 11L and 11R has a large number of light emitting elements 12 disposed side by side in the front-rear direction of the vehicle, the illumination regions of the adjacent light emitting elements 12 can overlap each other. Therefore, the brightness of the illumination is improved, and it is possible to prevent the illumination light from being blocked by the occupant moving in the vehicle or seats and forming shadows.

When a large number of light emitting elements 12 of the light source lamp modules 11L and 11R are divided into a plurality of regions, and energization control is selectively performed for each region, for example, as in the various circuit connection patterns PC1 to PC13 shown in FIG. 16, various illumination patterns can be selectively used and various kinds of hospitality presentation.

The present disclosure is not limited to the above embodiments, and modifications, improvements, and the like can be made as appropriate. In addition, a material, shape, size, number, arrangement position, and the like of each component in the embodiment described above are optional and are not limited as long as the present disclosure can be achieved.

According to a first aspect of the present disclosure, a vehicular illumination device (rear illumination unit 10) to be disposed on a ceiling portion in a vehicle passenger compartment includes: a left-row light source unit (light source lamp module 11L) in which three or more light sources (emitting elements 12) arranged side by side in a front-rear direction of the vehicle is disposed on a left side of a center in a width direction of the vehicle; and a right-row light source unit (light source lamp module 11R) in which three or more light sources (emitting elements 12) arranged in the front-rear direction of the vehicle is disposed on a right side of the center in the width direction of the vehicle. Optical paths of the light sources are set to be placed in a state (see, for example, FIG. 4A) where a light irradiation region of the left-row light source unit and a light irradiation region of the right-row light source unit partially overlap with each other on a floor surface in the vehicle passenger compartment.

According to the vehicular illumination device of the first aspect, the light irradiation regions of the left-row light source unit and the right-row light source unit overlap each other on a portion such as the floor surface in the center of the vehicle passenger compartment, so that it is possible to brightly illuminate the floor surface in an aisle such as a central portion of the vehicle in the width direction. In addition, since in each of the left-row light source unit and the right-row light source unit, three or more light sources are disposed side by side in the front-rear direction of the vehicle, the light irradiation regions of the light sources adjacent to each other can overlap each other in the front-rear direction of the vehicle. Therefore, it is possible to increase the light amount in illumination by overlapping a plurality of illumination regions, and it is also possible to reduce the unevenness of the light amount in illumination. Further, since the entire illumination light is not blocked by seats or the occupant's body when the occupant walks along the aisle in the vehicle passenger compartment, shadows are less likely to form on the floor surface, making it easier for the occupant to move around in the vehicle passenger compartment at night.

According to a second aspect of the present disclosure, the left-row light source unit (light source lamp module 11L) and the right-row light source unit (light source lamp module 11R) are supported by a common housing (circuit board 13), and a relative positional relationship between the light irradiation region of the left-row light source unit and the light irradiation region of the right-row light source unit is fixed in advance to the common housing.

According to the vehicular illumination device of the second aspect, the relative positional relationship between the light irradiation region of the left-row light source unit and the light irradiation region of the right-row light source unit is fixed in advance, so that it is easy to design the optical path such that an illuminance distribution in the entire illumination range combining the light irradiation region of the left-row light source unit and the light irradiation region of the right-row light source unit is appropriate for the occupant.

According to a third aspect of the present disclosure, an outer side of the light irradiation region of at least one of the left-row light source unit and the right-row light source unit spreads to an upper range than a lower end of a vehicle door (sliding door 21L and 21R).

According to the vehicular illumination device of the third aspect, reflected light of the illumination light radiated to a part of the vehicle door can also be used in a state where the vehicle door is closed, so that it is possible to improve the brightness in the illumination near a side of the vehicle passenger compartment. In addition, in a state where the vehicle door is open, it is possible to illuminate regions near the feet of the occupant getting on and off, such as the ground and regions of steps near the vehicle door. Therefore, a dedicated illumination device for illuminating the feet of the occupant is not required.

According to a fourth aspect of the present disclosure, the vehicular illumination device further includes a lighting mode switching unit (illumination channel switching unit 33) that selectively switches a lighting range and a non-lighting range among the light sources arranged side by side in the front-rear direction of the vehicle in each of the left-row light source unit and the right-row light source unit.

According to the vehicular illumination device of the fourth aspect, the illumination range can be selected as needed, so that it is possible to produce not only the purpose of illumination but also the presentation using illumination for providing hospitality to the occupant.

According to a fifth aspect of the present disclosure, the vehicular illumination device further includes an automatic control unit (hospitality presentation control unit 35) that detects a predetermined situation of the vehicle to automatically switch a lighting mode in response to a change in the situation, the lighting mode being selected by the lighting mode switching unit.

According to the vehicular illumination device of the fifth aspect, the lighting mode to be selected is automatically switched according to the situation, so that it is possible to automatically perform presentation for providing hospitality to the occupant, for example, linked to the operation of a smart key or a door open/close operation.

According to the vehicular illumination device of the present disclosure, it is possible to form a bright environment in which an occupant can easily live in a living space inside a vehicle even in a dark environment.

What is claimed is:

1. A vehicular illumination device to be disposed on a ceiling portion in a vehicle passenger compartment, the vehicular illumination device comprising:

a left-row light source unit including a plurality of left-row module regions each having three or more light sources arranged side by side in a front-rear direction of the vehicle, the left-row light source unit being disposed on a left side of a center in a width direction of the vehicle;

a right-row light source unit including a plurality of right-row module regions each having three or more light sources arranged in the front-rear direction of the vehicle, the right-row light source unit being disposed on a right side of the center in the width direction of the vehicle; and a master control unit configured to give instructions for illuminations to the left-row light source unit and the right-row light source unit to provide hospitality to an occupant of the vehicle by controlling the illuminations of the left-row light source unit and the right-row light source unit, wherein optical paths of the light sources are set to be placed in a state where a light irradiation region of the left-row light source unit and a light irradiation region of the right-row light source unit partially overlap with each other on a floor surface in the vehicle passenger compartment, and the master control unit executes a hospitality control to turn on the light sources of the left-row light source unit and the right-row light source unit towards the front-rear direction for each of the left-row module regions and the right-row module regions, from a state where all the light sources of the left-row light source unit and the right-row light source unit are in off-state.

2. The vehicular illumination device according to claim 1, wherein the left-row light source unit and the right-row light source unit are supported by a common housing, and a relative positional relationship between the light irradiation region of the left-row light source unit and the light irradiation region of the right-row light source unit is fixed in advance to the common housing.

3. The vehicular illumination device according to claim 1, wherein an outer side of the light irradiation region of at least one of the left-row light source unit and the right-row light source unit spreads to an upper range than a lower end of a vehicle door.

4. The vehicular illumination device according to claim 1, further comprising:

a lighting mode switching unit that selectively switches a lighting range and a non-lighting range among the light sources arranged side by side in the front-rear direction of the vehicle in each of the left-row light source unit and the right-row light source unit.

5. The vehicular illumination device according to claim 4, further comprising:

an automatic control unit that detects a predetermined situation of the vehicle to automatically switch a lighting mode in response to a change in the situation, the lighting mode being selected by the lighting mode switching unit.

6. The vehicular illumination device according to claim 1, wherein the illumination device is located in the center of the vehicle in the width direction thereof.

7. The vehicular illumination device according to claim 1, wherein the light sources are all the same color.

8. The vehicular illumination device according to claim 1, wherein the left-row light source unit and the right-row light source unit are symmetrically arranged at an equal distance from the center in the width direction with each other.

9. The vehicular illumination device according to claim 1, wherein the left-row light source unit and the right-row light source unit are separated from each other by at least ¼ of a width of the vehicle body in the width direction.

10. The vehicular illumination device according to claim 9, wherein the left-row light source unit and the right-row light source unit are separated from each other by at least ½ of the width of the vehicle body in the width direction.

11. The vehicular illumination device according to claim 1, wherein, in the state, the light irradiation region of the left-row light source unit and the light irradiation region of the right-row light source unit partially overlap with each other in the width direction over a length in the front-rear direction of the left-row light source unit and the right-row light source unit on the floor surface in the vehicle passenger compartment.

12. The vehicular illumination device according to claim 11, wherein the length in the front-rear direction of the left-row light source unit and the right-row light source unit corresponds to a distance from a driver seat or a passenger seat to a row seat of the vehicle.

13. The vehicular illumination device according to claim 1, wherein the hospitality control is linked to an open-close position and an open-close speed of a vehicle door.

* * * * *